United States Patent [19]
Verkuil

[11] Patent Number: 4,941,278
[45] Date of Patent: Jul. 17, 1990

[54] VERTICAL FISHING TRIP-UP

[76] Inventor: Steve Verkuil, 32 Birch Road, Fort McMurray, Alberta, Canada, T9H 1J7

[21] Appl. No.: 446,725

[22] Filed: Dec. 6, 1989

[51] Int. Cl.$^5$ .............................................. A01K 91/06
[52] U.S. Cl. ........................................................ 43/15
[58] Field of Search ................................ 43/15, 16, 17

[56] References Cited

U.S. PATENT DOCUMENTS

| | | | |
|---|---|---|---|
| 1,520,556 | 12/1924 | Beckwith | 43/17 |
| 3,034,247 | 5/1962 | Lunsman | 43/17 |
| 3,187,456 | 6/1965 | Apitz | 43/17 |
| 3,410,015 | 11/1968 | Garcia | 43/15 |
| 3,474,561 | 10/1969 | McConkey | 43/16 |
| 4,522,572 | 6/1985 | Hahn | 43/17 |

*Primary Examiner*—M. Jordan
*Attorney, Agent, or Firm*—Dressler, Goldsmith, Shore, Sutker & Milnamow

[57] ABSTRACT

A fishing device is provided which is functional both to hook the fish and to signal the fisherman that the bait has been taken. A trigger mechanism is utilized to release a leaf spring which is connected to a fishing rod. Actuation of the trigger mechanism forces the fishing rod upwardly with sufficient force to hook the fish.

4 Claims, 1 Drawing Sheet

U.S. Patent  Jul. 17, 1990  4,941,278
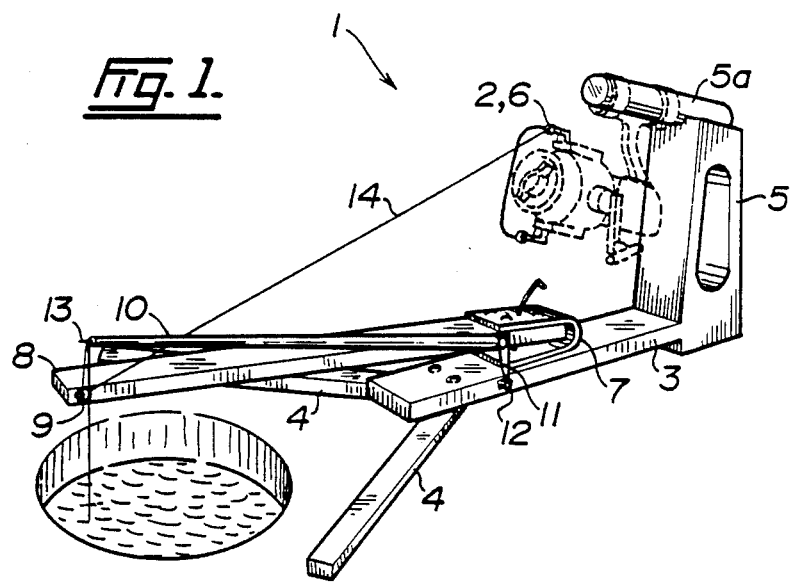
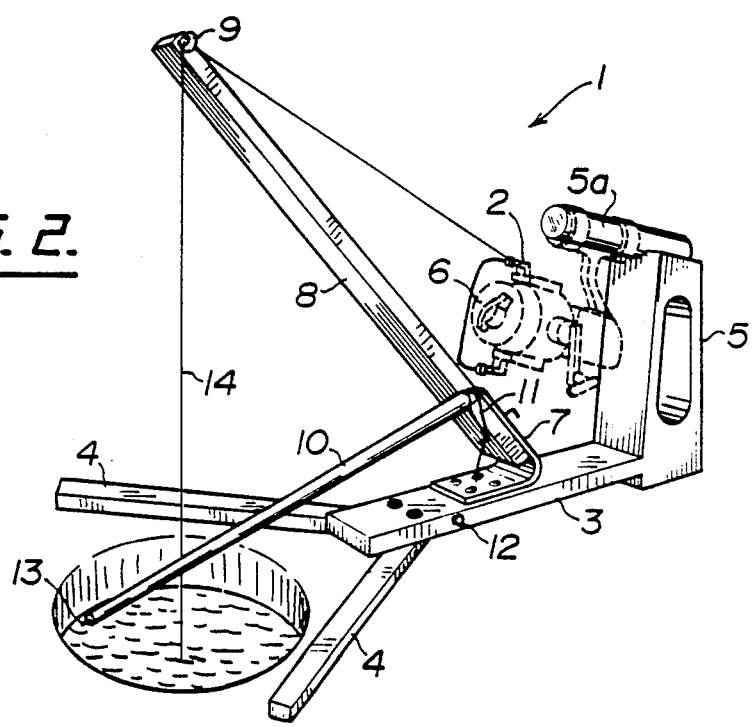

VERTICAL FISHING TRIP-UP

FIELD OF THE INVENTION

The present invention relates to a fishing device. More particularly, the invention relates to an ice-fishing device.

BACKGROUND OF THE INVENTION

By way of background, ice-fishing typically involves drilling a hole of approximately 8" in diameter, and positioning the tip of a fishing rod over the hole. The rod is jigged up and down occasionally to attract the fish. When a fish bites then the hook is set manually. However, in order to overcome the problems attendant with fishing in cold climates, as well as to increase ones success, the fisherman will often set up a number of 'dead lines', that is to say lines which are not hand held, on 'tip-ups'. By tip-ups is meant devices which indicate a strike by the fish. Exemplary devices are described in U.S. Pat. Nos. 3,143,822, 4,373,287, and 4,567,686. It is to be noted, however, that these prior art devices function only as signalers that the fish has taken the bait.

It is an objective of the present invention to provide a device that is functional to not only indicate when the bait has been taken, but additionally that the fish has been hooked.

SUMMARY OF THE INVENTION

In accordance with the present invention there is provided a fishing device which is functional both to hook the fish and to signal the fisherman that the bait has been taken. The device is particularly adapted for ice-fishing but with suitable modifications could be utilized for other types of deep water fishing.

More specifically, the device relies on a trigger mechanism. The trigger mechanism releases a leaf spring which is operatively connected on one side to a fishing rod and on the other side to a base. The device is used in conjunction with a modern commercially available fishing reel to thereby provide control of the tension on the fishing line. In operation, the trigger mechanism is first set. When the fish takes the bait on the hook of the fishing line, the trigger mechanism is actuated. The spring is released and the fishing rod moved upwardly with sufficient force to hook the fish. The relative positioning of the trigger rod and fishing rod further provide means of signalling when the fish has been hooked.

In a broad aspect, the invention relates to a device for hooking a fish which comprises:
 a base member;
 a fishing rod;
 a generally V-shaped leaf spring, said spring having one leg thereof mounted on said base member and the other leg thereof being secured to the inner end of said rod;
 a reel support means, said means being associated with said base member;
 a reel having a fishing line associated therewith, said reel being mountable on said reel support means;
 trigger means associated with said rod and said base member, said means being adapted to maintain said spring in a compressed position until a fish actuates the trigger means whereupon said spring is released and said fishing rod moves upwardly; and
 a stop member associated with said fishing rod to limit the upward movement thereof.

DESCRIPTION OF THE DRAWINGS

FIG. 1 is one embodiment of an ice-fishing device in the set position.

FIG. 2 is the ice-fishing device of FIG. 1 in the released position.

DESCRIPTION OF THE PREFERRED EMBODIMENT

Having reference to the accompanying drawings, there is provided a fishing device 1 having a conventional fishing reel 2 mounted thereon. Whilst the present invention is described in terms of its application as an ice-fishing device it is to be understood that the scope of the present invention is not limited thereto.

More specifically, a generally rectangular base 3 is utilized. A pair of legs 4 are mounted adjacent the outer end of the base 3 and extend outwardly therefrom. The legs 4 are adapted to splay over the hole which has been drilled in the ice providing stability to the device 1. A support 5 is positioned at the outer end of the base 3. A conventional fishing reel 2 is affixed to a handle 5a that extends forwardly from the support 5.

A leaf spring 7 is utilized. The spring 7 is secured on one side to the base 3 and on the other to a fishing rod 8. A hook extends through the spring 7 and rod 8 to limit the upward movement of the latter. A guide 9 is mounted at the outer end of the rod 8.

A trigger rod 10 is pivotally mounted on the fishing rod 8. At its inner end is a latch 11 pivotally mounted thereon. The latch 11 is adapted to releasably engage a bolt 12 mounted on the base 3. A pin 13 is secured to the outer end of the trigger rod 10 to act as a fishing line guide means when the trigger rod 10 is set.

In operation, the device is set as follows. The legs 4 are spread open over the hole. The fishing rod 8 is pushed down and the latch 11 of the trigger rod 10 is brought in engagement with the bolt 12. The fishing line 14 is lifted and laid over the pin 13. The device is now set. When the fish tugs on the fishing hook (not shown) the line 14 is jerked downwardly releasing the trigger rod 10, whereupon the spring 7 is released moving the fishing rod 8 upwardly with sufficient force to hook the fish.

The claimed are:

1. A device for hooking a fish which comprises:
 a base member;
 a fishing rod;
 a generally V-shaped leaf spring, said spring having one leg thereof mounted on said base member and the other leg thereof being secured to the inner end of said rod;
 a reel support means, said means being associated with said base member;
 a reel having a fishing line associated therewith, said reel being mountable on said reel support means;
 trigger means adapted to maintain said spring in a compressed position until a fish actuates the trigger means whereupon said spring is released and said fishing rod moves upwardly; and
 a stop member associated with said fishing rod to limit the upward movement thereof.

2. The device as set forth in claim 1 which further comprises:
 a pair of leg members pivotally mounted on said base member, said leg members being adapted in the operative position to form a generally V-shaped array, said leg members further being adapted to extend outwardly beyond the end of said fishing rod so as to provide stability thereto.

3. The device as set forth in claim 2 further comprising a handle member associated with said reel support member.

4. The device as set forth in claim 3 wherein said reel support member, said handle member and said base member all form a substantially unitary member.

* * * * *